Figure 1:
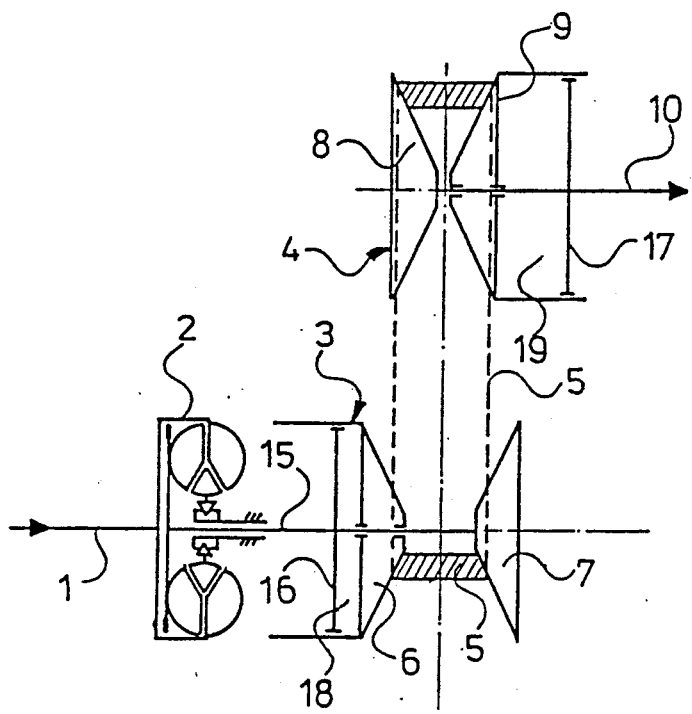

United States Patent [19]

Hendriks

[11] Patent Number: 5,048,371
[45] Date of Patent: Sep. 17, 1991

[54] CONTINUOUSLY VARIABLE TRANSMISSION PROVIDED WITH A TORQUE CONVERTER

[75] Inventor: Emery F. M. Hendriks, NR Heeze, Netherlands

[73] Assignee: Van Doorne's Transmissie B.V., Tilburg, Netherlands

[21] Appl. No.: 501,340

[22] Filed: Mar. 27, 1990

Related U.S. Application Data

[63] Continuation of Ser. No. 295,097, Jan. 9, 1989, abandoned.

[30] Foreign Application Priority Data

Feb. 2, 1988 [NL] Netherlands .................... 8800246

[51] Int. Cl.$^5$ .............................................. F16H 47/06
[52] U.S. Cl. ..................................... 74/730.1; 60/355
[58] Field of Search ................. 74/730.1; 60/347, 355

[56] References Cited

U.S. PATENT DOCUMENTS

| | | | |
|---|---|---|---|
| 3,808,809 | 5/1974 | Upton | 60/347 |
| 3,986,356 | 10/1976 | Frotschner et al. | 60/355 X |
| 4,274,520 | 6/1981 | Van der Haudt Aberson | 74/730 X |
| 4,455,888 | 6/1984 | Wayman et al. | 74/730 X |
| 4,478,105 | 10/1984 | Yamamuro et al. | 74/730 |
| 4,631,979 | 12/1986 | Tamura et al. | 74/730 |
| 4,649,773 | 3/1987 | Svab | 74/730 |

FOREIGN PATENT DOCUMENTS

| | | | |
|---|---|---|---|
| 1055832 | 4/1959 | Fed. Rep. of Germany | 60/355 |
| 57-69162 | 4/1982 | Japan . | |
| 901687 | 2/1982 | U.S.S.R. . | |

OTHER PUBLICATIONS

"Torque Converters or Transmissions"; by Heldt; pp 79-83 & 272-283; 4th edition; Aug. 1951.

Primary Examiner—Dwight Diehl
Attorney, Agent, or Firm—Pennie & Edmonds

[57] ABSTRACT

A continuously variable transmission (3, 4, 5, 6, 7, 8, 9) is provided with a torque converter (2) having an ingoing shaft (1), whereby the torque converter has such torque converting factors at various speeds of the ingoing shaft that the torque characteristic of the torque converter approximates the characteristic of the maximum torque to be transmitted by means of the transmission and the control system for a substantial part of the speed range. This results in an increased torque at low speeds of the ingoing shaft, especially at driving off in a motor vehicle. Furthermore a loss of power is reduced because an overdimensioning of the control system which controls the pressure in control cylinders (18, 19) of the transmission is no longer needed.

12 Claims, 1 Drawing Sheet

CONTINUOUSLY VARIABLE TRANSMISSION PROVIDED WITH A TORQUE CONVERTER

This is a continuation of application Ser. No. 07/295,097, filed Jan. 9, 1989 now abandoned.

The invention relates to a continuously variable transmission provided with a primary shaft with a primary pulley mounted thereon, a secondary shaft with a secondary pulley mounted thereon, each pulley comprising two conical discs, at least one of the two pulleys being axially movable by means of a hydraulic control cylinder controlled by a control system, a driving belt provided between the secondary and the primary pulley, the primary pulley being drivable by an ingoing shaft via a torque converter.

Such a transmission is known from the Dutch patent application 8104001. In such a transmission it is usual that the transmission ratio is adjusted by means of pressure regulation in the hydraulic control cylinder of one of the pulleys, while the tension of the driving belt is controlled by means of regulation of the pressure in the hydraulic control cylinder, such that hardly any slip can occur between the driving belt and the pulleys and that the entire torque transmitted by an external drive on the driving shaft and increased by the torque converter can be transmitted to the driving belt.

A drawback of this known transmission is that the characteristic of the torque maximally to be transferred by the transmission with the control system does not match the characteristic of the torque delivered by the torque converter. The control system is therefore usually strongly overdimensioned for one or more speed ranges of the ingoing shaft in order to be able to lead the torque delivered by the torque converter through the transmission for other speed ranges as well. This results in loss of power and a high pressure on the driving belt so that it needs to be overdimensioned in relation to the torque delivered by the transmission.

The purpose of the invention is to obviate these drawbacks. For this purpose the invention is characterized in that the hydrodynamic torque converter has such torque converting factors at various speeds of the ingoing shaft that the torque characteristic of the torque converter approximates the characteristic of the maximum torque to be transmitted by means of the transmission and the control system for a substantial part of the speed range.

As a result of this measure advantageous use is made, at low speeds of the ingoing shaft, of an increased torque which is transmitted by the torque converter to the primary pulley and therewith by the driving belt to the secondary pulley. Said increased torque is greatly desirable, especially as a driving off torque in a motor vehicle. On the other hand the control system does not have to be overdimensioned as a result of the use of the torque converter with said characteristic for higher operating speeds, as a result of which the loss of power is reduced considerably.

In general the combustion engine of a motor vehicle has an operating speed range of about 1000 to about 6000 revolutions per minute. The normal operating speed lies roughly between 2500 and 4000 revolutions per minute. In that situation it is preferably provided that the converting factor of the hydrodynamic torque converter is 2 at most of an engine speed range of 1000–2000 revolutions per minute and approximates the value 1 in the engine speed range of 2000–4000 revolutions per minute, while it has become apparent that the most advantageous gearing of the characteristics of engine and torque converter on the one hand and the continuously variable transmission on the other hand is obtained when said converting factor lies between 1.5 and 1.8 in the engine speed range of 1000–2000 revolutions per minute. Further a so called lock-up of the torque converter can avantageously be used.

Figure 2:
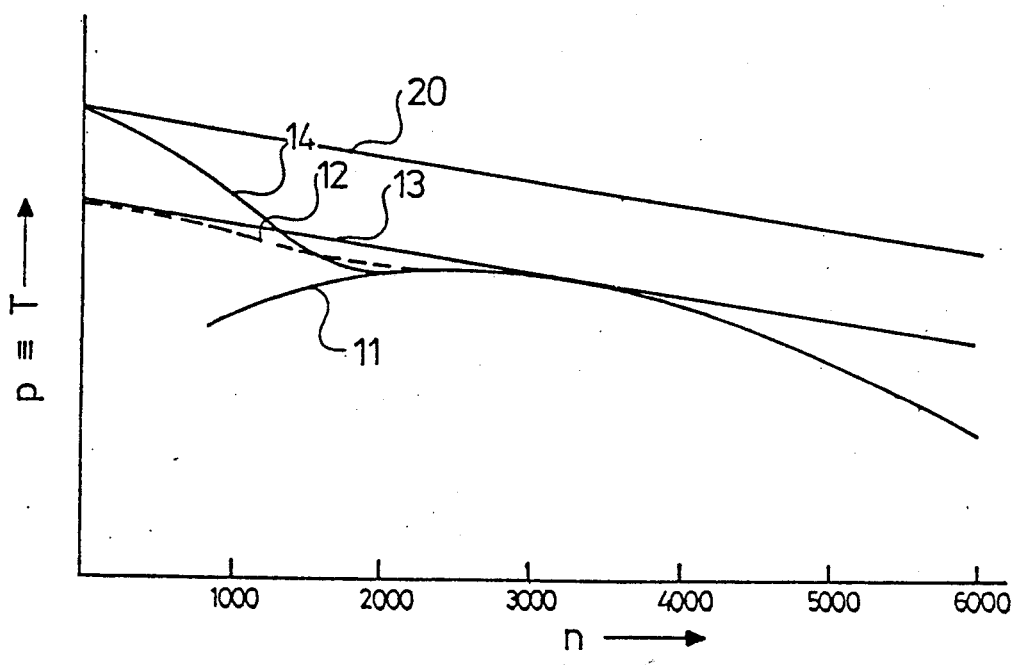

The invention will be explained with reference to a drawing in which:

FIG. 1 is a simplified diagram of the continuously variable transmission with torque converter and FIG. 2 is a graphic illustration of the torque-speed characteristics of engine and torque converter as well as the characteristic of the control system.

A primary shaft 15 is drivably coupled to an ingoing shaft 1 by means of a torque converter 2. On the primary shaft 15 there is mounted a primary pulley 3 which comprises two conical discs 6 and 7, the disc 6 being provided axially movably on the primary shaft 15. On a secondary shaft 10 there is provided a secondary pulley 4 comprising two conical discs 8 and 9, the disc 9 being provided axially movably on the secondary shaft 10. The axially movable discs 6 and 9 form, together with a wall 16, 17 respectively, a pair of hydraulic control cylinders 18 and 19. Between the pulleys 3 and 4 there is stretched a driving belt 5. The pressure can be regulated separately in the hydraulic cylinder 18 of the primary pulley 3 and in the hydraulic cylinder 19 of the secondary pulley by means of a control system (not shown). One of the two pressures, the line pressure, thereby determines the tension in the driving belt 5 and therewith the maximum torque to be transmitted by means of said driving belt. The pressure in the other hydraulic cylinder determines the radial position of the driving belt 5 between the pulleys, and therewith the transmission ratio.

FIG. 2 illustrates a number of torque characteristics as a function of the speed of the ingoing shaft. Curve 20 thereby illustrates the maximum torque to be produced with the control unit and to be transmitted by the transmission and the driving belt. Curve 11 is the torque characteristic of the ingoing shaft 1 driven by means of an external drive, whilst curve 14 illustrates the torque characteristic after a conventional torque converter such as e.g. disclosed in the Dutch patent application 8104001. From FIG. 2 it is apparent that especially in the normal and the high operating speed ranges there is a considerable difference between the torque 14 of the torque converter and the torque 20 maximally to be transmitted with the transmission. The control unit is overdimensioned for this speed range in order to be able to transmit the torque 14 delivered by the conventional torque converter at the lower speeds. The characteristic of the torque converter 2 such as used in the invention is illustrated by means of curve 12. The corresponding characteristic 13 of the maximum torque to be transmitted by the transmission and the control unit can always be chosen much lower thereby and is at no point overdimensioned in relation to the torque characteristic of the torque converter. In this torque converter the increased torque delivered by the torque converter in the low speed range is used advantageously for an increased drive-off torque. On the other hand the torque characteristic 12 of the torque converter also matches the characteristic 13 of the maximum torque to be transmitted with the transmission for the normal and high speeds, as a result of which there will be hardly any loss of power. Moreover, the driving belt is not excessively loaded hereby so that an overdimensioning of the driving belt is not necessary.

It will be apparent that the invention has not been described exhaustively with reference to the embodiment and that modifications of the invention will be obvious to a person skilled in the art. Such modifications are considered to fall within the scope of the invention.

I claim:

1. Continuously variable transmission having a maximum torque characteristic and transmitting torque over a full speed range provided with a primary shaft with a primary pulley mounted thereon, a secondary shaft with a secondary pulley mounted thereon, each pulley comprising two conical discs, at least one of the two pulleys being axially movable by means of a hydraulic control cylinder, a driving belt being provided between the secondary pulley and the primary pulley, a hydrodynamic torque-converter with an ingoing shaft having a speed range of about 1000 to about 6000 revolutions per minute and a normal operating speed range between about 2500 and 4000 revolutions per minute, the primary pulley being drivable by the ingoing shaft via the hydrodynamic torque-converter, the torque-converter having a torque characteristic representing the torque delivered thereby whose torque-converting factors are chosen such, that the maximum torque to be transmitted by means of said transmission is lowered in substantial equal amounts over the full speed range concerned resulting in a lowered maximum torque characteristic of said transmission, the lowered maximum torque characteristic substantially matching the torque characteristic of said torque-converter over said full speed range and the converting factor of the torque converter being about 2 at most at a speed range of 1000–2000 revolutions per minute.

2. An improved continuously variable transmission provided with a primary shaft with a primary pulley mounted thereon, a secondary shaft with a secondary pulley mounted thereon, each pulley comprising two conical discs, at least one of the two pulleys being axially movable by means of an hydraulic control cylinder, a driving belt being provided between the secondary pulley and the primary pulley, a hydrodynamic torque-converter with an ingoing shaft having a speed range of about 1000 to about 6000 revolutions per minute and a normal operating speed range between about 2500 and 4000 revolutions per minute, the primary pulley being drivable by the ingoing shaft via the hydrodynamic torque converter, the torque converter having a torque characteristic representing the torque delivered thereby, the improved transmission having a torque characteristic representing the maximum torque deliverable thereby and further having the torque characteristic of the hydrodynamic torque convert matching the torque characteristic representing the maximum torque deliverable by the improved transmission and the converting factor of the torque converter being about 2 at most at a speed range of 1000–2000 revolutions per minute.

3. Transmission according to claim 1 or 2, characterized in that the converting factor of the torque converter approximates the value 1 in the engine speed range of 2000–4000 revolutions per minute.

4. Transmission according to claim 1 or 2, characterized in that said converting factor lies between 1.5 and 1.8 in the engine speed range of 1000–2000 revolutions per minute.

5. Transmission according to claim 4, characterized in that the torque converter is provided with lock-up means.

6. Transmission according to claim 5, characterized in that the lock-up means are actuated when the converting factor of the torque converter has a value of about 1.

7. In a continuously variable transmission having a primary shaft with a primary pulley mounted thereon, a secondary shaft with a secondary pulley mounted thereon, each pulley comprising two conical discs, at least one of the two pulleys being axially movable by means of an hydraulic control cylinder, a driving belt provided between the secondary and primary pulley, and a hydrodynamic torque converter having an ingoing shaft and having a torque characteristic representing the torque delivered thereby, the primary pulley being drivable by the ingoing shaft by means of the torque converter, said transmission having a maximum torque capacity over an ingoing shaft speed range and the torque characteristic of the torque converter characterized by a significant peak at start-up, falling off relatively rapidly initially and finally relatively leveling off in a normal speed range and thereby only matching the maximum torque capacity of the transmission at start-up, the improvement wherein the torque converter has torque converting factors in the range of approximately 1.5–1.8 for the ingoing shaft speed range of approximately 100–2000 RPM, such that the maximum torque transmitted by said transmission is decreased equally with respect to said maximum torque capacity over the ingoing shaft speed range and the torque converting factors of the torque converter produce a torque characteristic that substantially matches the decreased maximum torque capacity of the transmission over a substantial part of the ingoing shaft speed range.

8. A continuously variable transmission having a continuous torque characteristic representing the maximum torque deliverable thereby, said transmission comprising:

a primary shaft with a primary pulley mounted thereon wherein said torque characteristic is a function of the speed of the primary shaft;

a secondary shaft with a secondary pulley, each said pulley comprising two conical discs and at least one of the two discs being axially moveable by means of an hydraulic control system; a driving belt provided between the secondary and primary pulleys; and an input shaft driving the primary pulley via a hydrodynamic torque converter with lock-up means for locking input shaft and primary pulley together at a lock-up speed, said torque converter having a torque characteristic representing the torque delivered thereby as a function of the speed of the input shaft; wherein said transmission torque characteristic is such that the maximum transmission torque is slightly larger than the output torque of the torque converter at the lock-up speed and that for input speeds smaller than the lock-up speed, the torque characteristic of the torque converter substantially matches the torque characteristic of the transmission.

9. Continuously variable transmission according to claim 8, wherein the hydrodynamic torque converter has a maximum converting factor of 2.0 in a speed range of 1000-2000 revolutions per minute.

10. Continuously variable transmission according to claim 8 or 9, wherein the hydrodynamic torque converter has a converting factor that approximates a lock-up value of 1.0 in the engine speed range of 2000-4000 revolutions per minute.

11. Continuously variable transmission according to claim 9 wherein said converting factor lies between about 1.5 and 1.8 in the input speed range of 1000-2000 revolutions per minute.

12. Continuously variable transmission, comprising:
a primary shaft with a primary pulley mounted thereon, said primary pulley comprising two conical discs, with at least one of said discs being axially movable by means of a hydraulic control system;
a secondary shaft with a secondary pulley mounted thereon, said secondary pulley comprising two conical discs, with at least one of said discs being axially movable by means of a hydraulic control system;
a driving belt provided between the secondary and primary pulleys; and
an input shaft driving the primary pulley via a hydrodynamic torque converter, said converter having lock-up means for locking said converter with respect to said transmission at a lock-up speed;
wherein said transmission has a maximum torque capacity only slightly larger than the output torque of the torque converter at the lock-up speed of said torque converter and said transmission maximum torque capacity substantially matches the output torque of the torque converter at input speeds less than the lock-up speed and also at input speeds greater than the lock-up speed.

* * * * *